United States Patent [19]

Magni

[11] E Patent Number: Re. 31,945

[45] Reissued Date of Patent: Jul. 16, 1985

[54] CONVEYOR APPARATUS

[75] Inventor: Antonio Magni, Florence, Italy

[73] Assignee: AXIS S.p.A., Italy

[21] Appl. No.: 442,913

[22] Filed: Nov. 19, 1982

Related U.S. Patent Documents

Reissue of:

[64] Patent No.: 4,306,646
Issued: Dec. 22, 1981
Appl. No.: 157,483
Filed: Jun. 9, 1980

U.S. Applications:

[63] Continuation of Ser. No. 851,754, Nov. 15, 1977, abandoned.

[30] Foreign Application Priority Data

Nov. 15, 1976 [IT] Italy ..... 9659 A/76

[51] Int. Cl.[3] ..... B65G 43/00

[52] U.S. Cl. ..... 198/341; 198/370; 198/655; 198/836; 29/732; 29/564.1; 29/714; 29/742; 29/784

[58] Field of Search ..... 198/339, 340, 341, 370, 198/472, 580, 655, 836; 29/732, 783, 791, 822, 564.1, 742, 784, 799, 824, 714

[56] References Cited

U.S. PATENT DOCUMENTS

| | | | |
|---|---|---|---|
| 2,648,419 | 8/1953 | Detrez | 198/655 |
| 2,884,113 | 4/1959 | Converse et al. | 198/340 |
| 3,313,393 | 4/1967 | Solski et al. | 198/472 |
| 3,991,619 | 11/1976 | Appleford et al. | 198/339 |

*Primary Examiner*—Joseph E. Valenza
*Attorney, Agent, or Firm*—Lerner, David, Littenberg, Krumholz & Mentlik

[57] ABSTRACT

Conveyor apparatus comprises an endless conveyor operative to convey workpieces past a number of processing stations. The workpieces are conveyed in seats of the conveyor, each of the seats being designated to receive a workpiece which is at a predetermined stage in the process. Means are provided to sense the presence of filled and empty seats and to control workpiece removal and depositing means associated with the processing stations so that workpieces are only removed from, and deposited in, the appropriate designated seats.

22 Claims, 12 Drawing Figures

CONVEYOR APPARATUS

Matter enclosed in heavy brackets [ ] appears in the original patent but forms no part of this reissue specification; matter printed in italics indicates the additions made by reissue.

[This is a continuation of application Ser. No. 851,754 filed Nov. 15, 1977, now abandoned.] *This application is a reissue of Ser. No. 157,483, filed June 9, 1980, now U.S. Pat. No. 4,306,646, which was a continuation of Ser. No. 851,754, filed Nov. 15, 1977, now abandoned.*

BACKGROUND OF THE INVENTION

1. Field of the Invention

The present invention relates to conveyors.

2. Description of the Prior Art

There has been proposed conveyor apparatus for workpieces which are to undergo processing operations along the path of the apparatus, for example workpieces in the form of rotors of electrical machines which are to undergo winding and welding operations.

Such apparatus comprises an endless flexible member having a plurality of seats for the workpieces and a plurality of processing stations (such as winding and welding stations) along an active upper path of said conveyor.

An object of the invention is to provide an improved apparatus of this type.

SUMMARY OF THE INVENTION

According to the present invention, there is provided conveyor apparatus comprising means defining an active conveyor path passing adjacent a plurality of processing stations, means defining an endless conveyor movable along said path, said conveyor having means defining seats for workpieces to be conveyed along said path, means operative to feed workpieces to predetermined seats of the conveyor, means associated with the processing stations for removing workpieces from the seats for processing at the corresponding stations and to deposit the processed workpieces into the seats, said seats consisting of a plurality of groups of seats, in each said group of seats individual seats being designated to receive only workpieces which are at a predetermined stage in the process, detecting means for detecting the instantaneous condition of the conveyor and the locations of filled and empty seats in predetermined positions of the seats along the path, said detecting means controlling the operation of the workpiece removal and depositing means whereby the workpiece removal and depositing means only remove workpieces from, and deposit workpieces into, the designated seats, and means enabling any incompletely processed workpieces to be returned to the beginning of the active conveyor path.

Further according to the present invention, there is provided conveyor apparatus comprising means defining an endless conveyor path passing adjacent a plurality of processing stations means defining an endless conveyor movable along said path, said conveyor having means defining seats for workpieces to be conveyed along said path, means operative to feed workpieces to predetermined seats of the conveyor, means associated with the processing stations for removing workpieces from the seats for processing at the corresponding stations and to deposit the processed workpieces into the seats, said seats consisting of a plurality of groups of seats, in each said group of seats individual seats being designated to receive only workpieces which are at a predetermined stage in the process, and means sensing the prescence of filled and empty seats in specific positions of the conveyor, said sensing means controlling the workpiece removal and depositing means, whereby the workpiece removal and depositing means only remove workpieces from, and deposit workpieces into, the appropriate designated seats.

BRIEF DESCRIPTION OF THE DRAWINGS

The invention will now be described, by way of example only, with reference to the accompanying drawings, in which.

DESCRIPTION OF THE PREFERRED EMBODIMENTS

Figure 1:
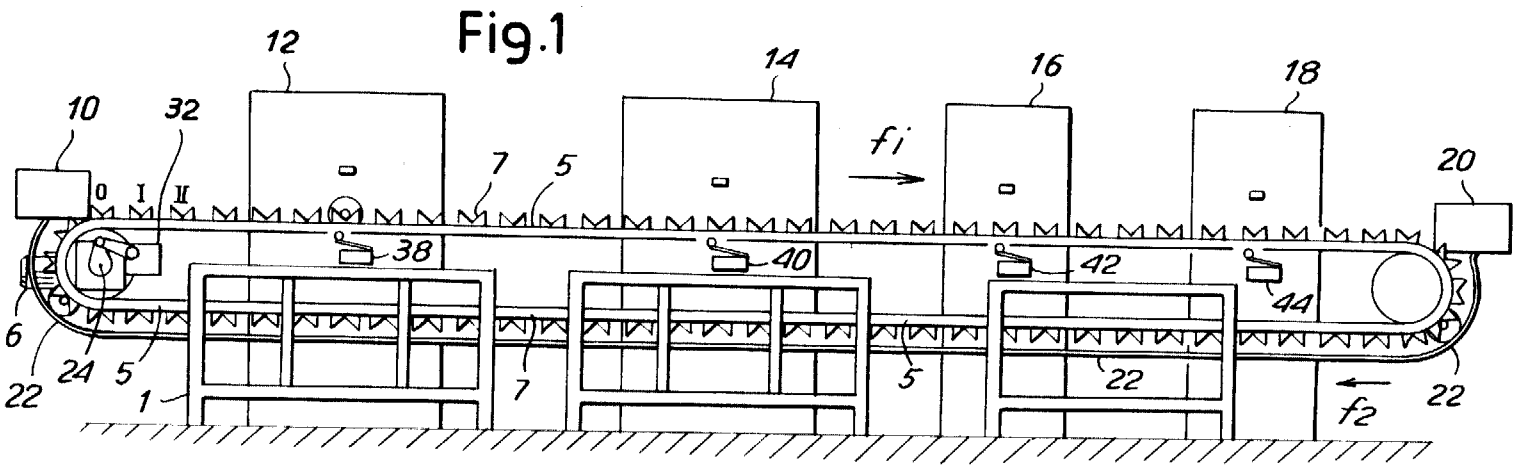
FIG. 1 is a side elevation of conveyor apparatus according to a first embodiment of the invention.
Figure 4:
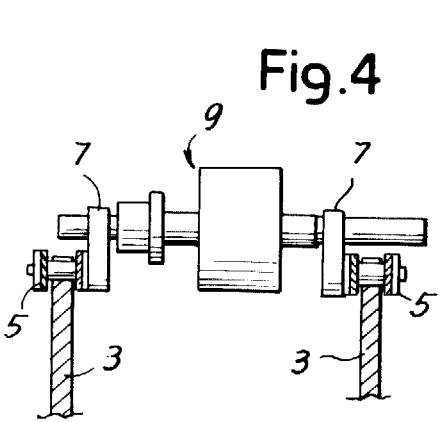
FIG. 4 is a fragmentary transverse section through the conveyor apparatus.

The conveyor apparatus shown in FIGS. 1 to 5 comprises a main frame 1 having guide means 3 (see FIG. 4) for an endless conveyor comprising two conveyor chains 5. The two chains 5 are driven in unison, the chains 5 being parallel and being suitably connected to each other. The chains are driven by means of a motor 6 which effects stepwise movement of the conveyor or continuous movement, with controls to stop and start the conveyor depending upon the condition of control means as will be described hereinafter. The conveyor chains 5 carry saddle shaped, i.e. V-shaped, seats 7, the seats 7 of the two chains being aligned to receive workpieces 9. These workpieces may be electric motor rotors which are to be subjected to various operations along the path of the conveyor, including winding of insulated wires and welding of the ends thereof to the commutators. The workpieces are fed to the conveyor by feed means 10.

Two successive winding stations 12 and 14 include winding machines of conventional type having means for picking-up the workpieces 9 from the seats 7 and for depositing the workpieces into the seats 7 after the winding operation. References 16 and 18 denote two successive welding stations including conventional welding machines also provided with pick-up and depositing means for the workpieces. Discharge means 20 are provided at the end of the conveyor to pick-up workpieces for delivery to further processing stations or for delivery to further conveyors.

The conveyor has means for retaining certain workpieces which are to be moved along the lower run of the conveyor in a direction $f_2$ opposite to the advance direction $f_1$ of the upper run for reasons which will be explained hereinafter. These means may be constituted by profiles 22 extending along the whole of the lower run, from the discharge means 20 to the feed means 10.

Figure 3:
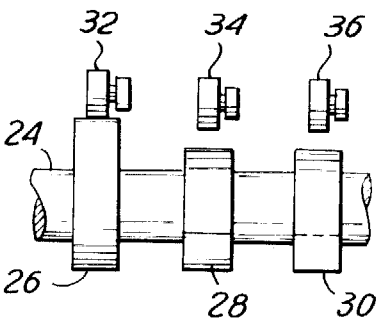
FIG. 3 is a view of the sensing means along line III—III of FIG. 2.
Figure 2:
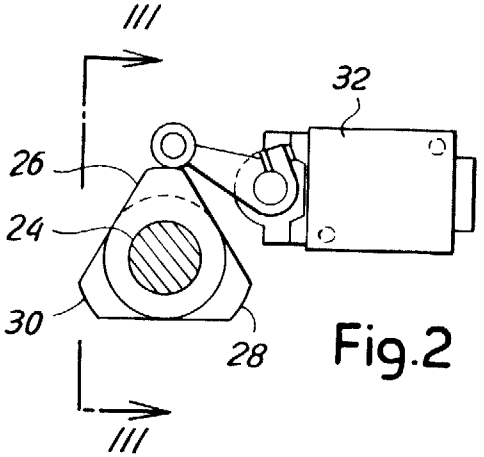
FIG. 2 is an enlarged view showing sensing means of the conveyor apparatus.

When the apparatus is being used for the manufacture of electric motor rotors (as described) the following are present on the conveyor—workpieces in an unwound state, wound workpieces still to be welded, and wound and welded workpieces. For this purpose, the conveyor has groups of three seats 7, in each of which the respective seats are designated to receive, respectively, the unwound workpieces, the wound and unwelded workpieces, and the wound and welded workpieces. In particular, in a group of three successive seats, one seat designated O is intended to receive an unwound workpiece, a second seat I is intended to receive a wound and unwelded workpiece, and a third seat II is intended to receive a wound and welded workpiece. Successive groups of said seats follow each other along the conveyor, whose seats are therefore arranged in groups of three, designated O, I and II. In order to designate the different seats, suitable marks may be provided on the same seats so that they can be recognized by sensor means, such as microswitches or the like, or selection means may be provided which are linked to the transmission means of the chain conveyor. In this latter case, as shown in FIGS. 2 and 3, on a shaft 24 which carries driving sprockets of the transmission means, there is provided a group of three cams 26, 28, 30 which are associated with three microswitches 32, 34 and 36. The cams 26, 28, 30 and the seats on the chain are positionally synchronized so that the position of the seats O, I, II of the successive groups is determined and set for the whole path by the position of the shaft 24, and thus of the cams, in any standstill position of the conveyor. At each of the stations 12, 14, 16 and 18 sensing means are provided to detect the presence or absence of a workpiece on a given seat positioned with respect to the corresponding group. Such sensing means may be microswitches 38, 40, 42, and 44, which detect the presence of a workpiece or the empty seat in the desired position at which the picking-up or the depositing of the workpiece must be accomplished in the respective group.

The unwound and unwelded workpieces from the feed means 10, are deposited in the seats which are designated O. The workpieces on the seats designated O can be picked-up for the winding operation at either of the stations 12 and 14, at which their presence is detected by the sensing means 38 and 40. At the stations 12 and 14 the then wound but unwelded workpieces are deposited into empty seats designated I which are also detected by the sensing means 38 and 40. At the stations 16 and 18, the sensing means 42 and 44 detect the presence of the workpieces in the seats designated I so that these workpieces are picked up for the welding operation; the then wound and unwelded workpieces are deposited into empty ones of the seats designated II and which are presented before the depositing position in the stations 16 and 18.

The selection among the O, I, and II seats and among occupied and empty seats is determined by the operative cooperation between the sensing means 32, 34, 36 and the sensing means 38, 40, 42, and 44, respectively.

Feeding and unloading of the conveyor can be controlled in response to means detecting the presence of empty seats O to operate the feed means 10, and means detecting the presence of occupied seats II to operate the discharge means 20.

The feed means 10 can accumulate workpieces ready for winding and welding so as to act as a storage unit between the conveyor and means upstream of the conveyor for the production or feeding of the workpieces. It may occur that certain workpieces are not wound, or welded at the stations 12, 14 or 16, 18, and these workpieces may be recycled along the lower run of the conveyor so that these workpieces can be presented again to the stations 12, 14 and 16, 18 until these workpieces are finished and deposited in the seats II and finally discharged. If more than a certain number of workpieces are accumulated at the feed means 10, there can be a stop in the production or of the feeding of further workpieces to the feed means 10.

Figure 5:
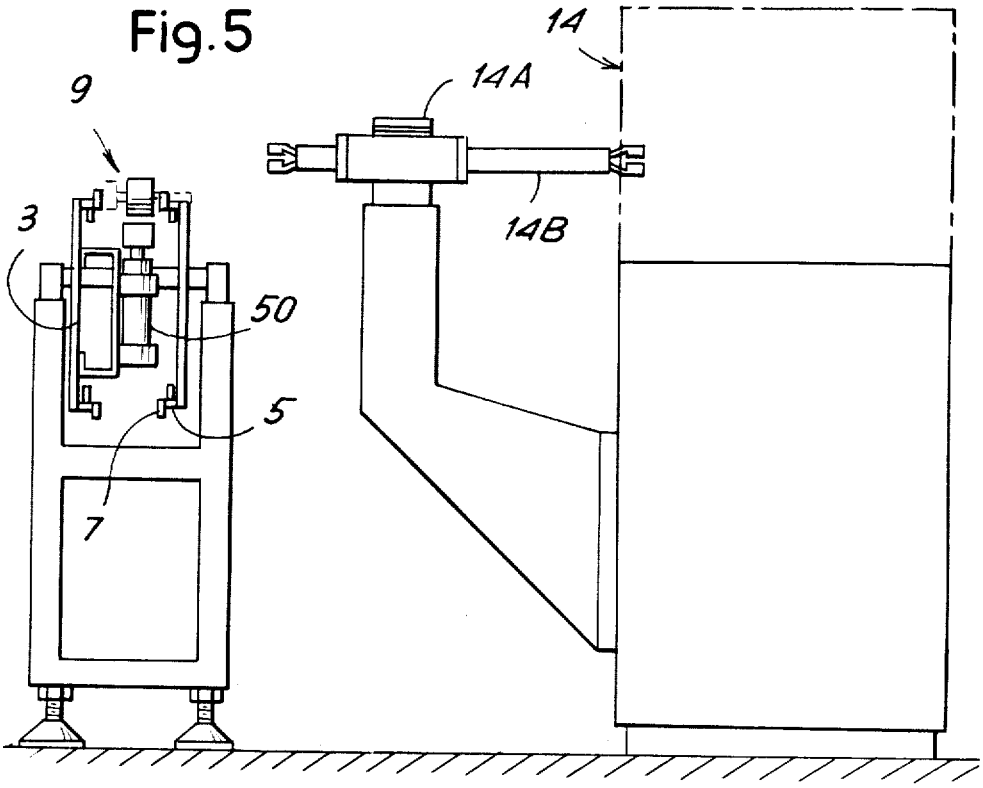
FIG. 5 shows schematically the conveyor apparatus and an associated working station.

FIG. 5 shows schematically the station 14 having a turret 14A movable around a vertical axis and carrying a double collet 14B which can be horizontally moved. In a pick-up and/or depositing zones associated with the station 14 there is a lift 50 responsive to the controls already described and operative to lift a workpiece from the seat 7 to present it to a collet 14B (and/or to present a workpiece to the seat 7 after receiving the workpiece from one of the collets 14B).

Figure 6:
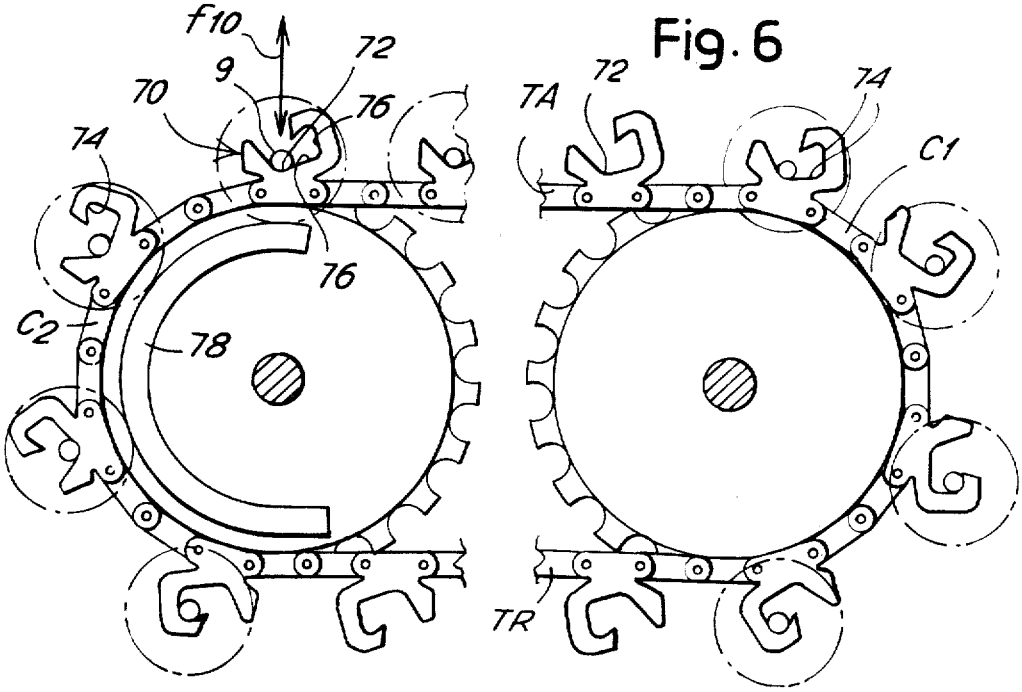
FIG. 6 shows a modified form of conveyor for the apparatus of FIGS. 1 to 5.
Figure 8:
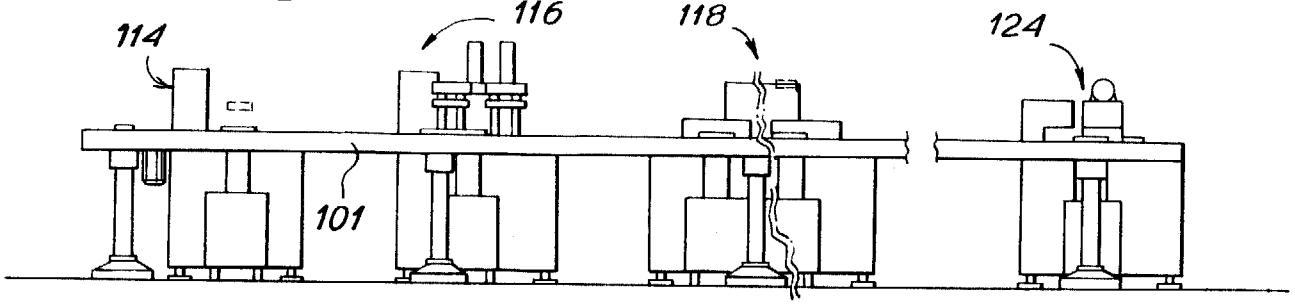
FIGS. 7 and 8 are a schematic plan view and side elevation of another embodiment of conveyor apparatus in accordance with the invention.
Figure 7:
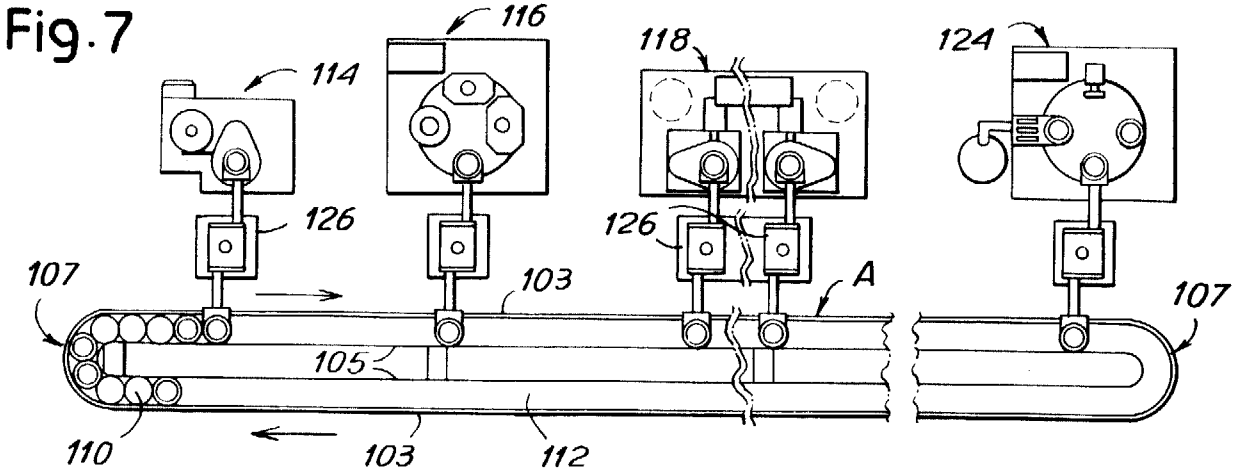
Figure 9:
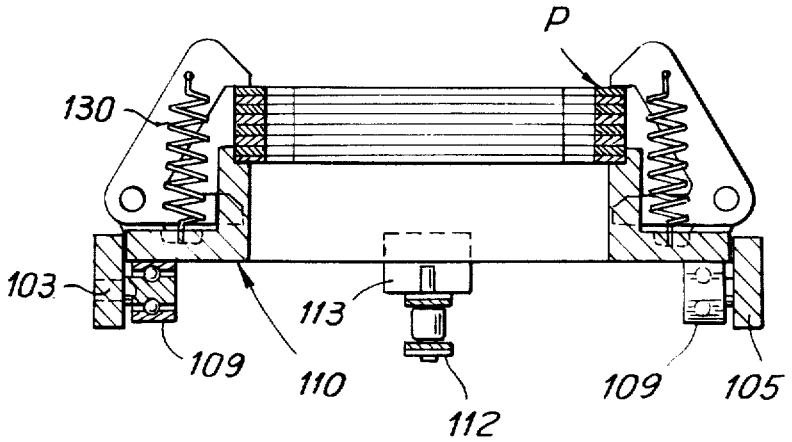
FIGS. 9 and 10 are cross-sections, to an enlarged scale, showing an endless flexible conveyor and a carriage of the apparatus shown in FIGS. 7 and 8.
Figure 10:
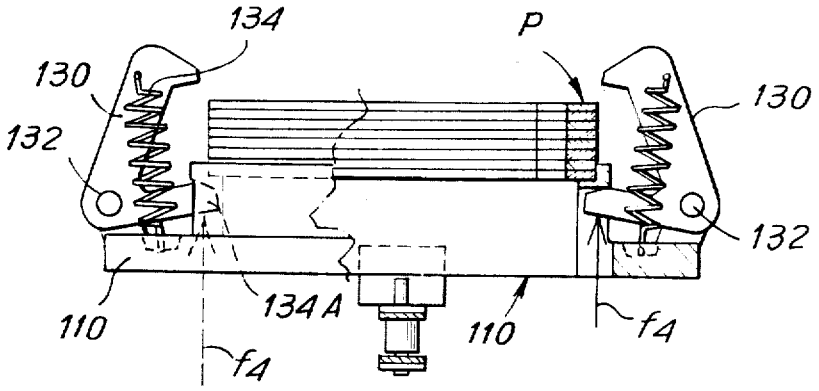

In a modified arrangement as shown in FIG. 6, instead of providing the guides 22, the seats (designated 70) are shaped with a saddle 72 to support the workpiece 9 along the upper run TA and with a reversed saddle 74 to support the workpiece along the lower run TR, the workpiece sliding from the saddle 72 to the saddle 74 along a curved portion C1 of the conveyor path by sliding along portion 76 of the seat. In order to retain the workpieces when moving along the other curved portion C2 of the conveyor path, electromagnetic means 78 can be provided, possibly energized by the passage of the seats of the groups O and I. The workpieces 9 are deposited and picked up along paths shown by the double arrow f10.

In the embodiment illustrated in FIGS. 7 to 12, 101 denotes an elongate casing (see FIG. 8) in which are arranged two opposed guides 103, 105 extending in a closed loop to form an annular track having two parallel rectilinear portions which are joined at the ends by curved portions 107. Along the opposite faces of the guides 103 and 105 are located rollers 109 mounted in stationary positions to form tracks for workpiece conveying members 110 which form carriages. The carriages 110 are arranged in an endless loop and may be entrained by an endless chain 112 (or other flexible endless members), the chain being suitably guided along a path located between the guides 103, 105 and the tracks formed by the rollers 109.

Means such as those indicated at 114, 116, 118, 120, 122, 124, and intended to effect the same operation or different operations on the workpieces, are provided along a rectilinear portion A of the annular track. The above described arrangement of these means is similar to that of the working stations in the previous embodiment. The means 118, 120, 122 may operate in parallel to effect the same operation in a slower manner than those operated, for instance, by the means 114, 116, 124. The means 118, 120, 122 may each be associated with two mechanical grippers or hands 126 for transferring the workpieces to and from the conveyor portion A by angular movement in a horizontal plane. A similar mechanical gripper is associated with each of the other means 114, 116, 124.

A carriage 110 can be engaged by the mechanical grippers and transferred together with the workpiece P transported thereby and which still has to undergo an operation. The workpiece P may for instance, be a stator or an annular rotor of an electric motor, on which a winding is to be applied or another preliminary or complementary or subsequent operation is to be carried out. In the case of an annular workpiece P, the workpiece is located in an annular recess of the carriage 110 (see FIGS. 9 and 10), and the carriage has jaws 130 articulated at 132 to the carriage 110 and biased by springs 134 in such a direction as to engage the workpiece P. The jaws 130 can be opened by means of suitable pushers (not shown) which act in the direction of the arrows $f_4$ of FIG. 10 and which pass through suitable recesses in the carriage 110 to act on arms 134A of the jaws; the pushers will be arranged to act in correspondence of loading and unloading positions of the manual or automatic type. Unloading may also be provided from the final processing means 124, when the arrangement is such that at least at this station the carriage 110 is carried from the conveyor to the processing means together with the workpiece P for the final working.

The several carriages 110 are engaged by the chain 112 by appropriate projections 143 so that a respective carriage is engaged between pairs of adjacent projections in such a manner that each carriage 110 may be seized by a mechanical gripper, such as 126.

Figure 11:
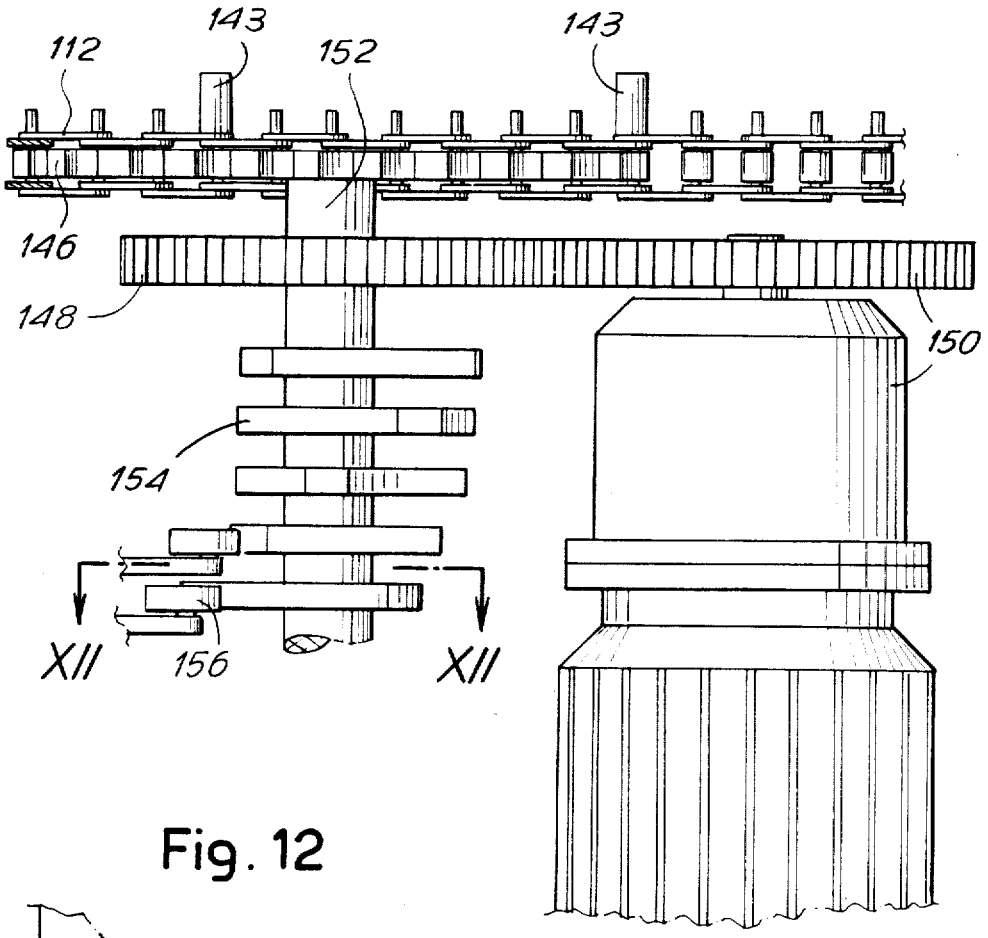
FIGS. 11 and 12 are respectively, a vertical section and a section taken along line XII—XII of FIG. 11 showing a driving and control system of the apparatus as shown in FIGS. 7 and 8.
Figure 12:
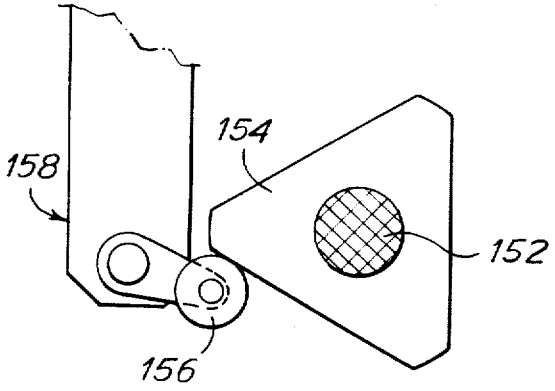

The chain 112 is driven by a gear wheel 146 located at one of the curved portions of the track and actuated by a pinion 148 meshing with a pinion of a drive unit 150 (see FIG. 11). Appropriately shaped cams 154 are provided on a shaft 152 of the members 146, 148 and are positioned in order to cooperate each with an appropriate feeler 156 of means 158, which may be a switch or the like, to determine the control for the loading, unloading and the intermediate removals, following the same criteria already discussed in connection with the previous embodiment. The positions of the seats defined by the projections 143 of the chain 112 are always controlled by the cams 154, with each seat designated for a specific function.

What is claimed is:

1. Conveyor apparatus comprising means defining an active conveyor path passing adjacent a plurality of processing stations, means defining an endless conveyor movable along said path, said conveyor having means defining seats for workpieces to be conveyed along said path, means operative to feed workpieces to predetermined seats of the conveyor, means associated with the processing stations for removing workpieces from the seats for processing at the corresponding stations and to deposit the processed workpieces into the seats, said seats consisting of a plurality of groups of seats, in each said group of seats individual seats being designated to receive only workpieces which are at a predetermined stage in the process, detecting means for detecting the instantaneous condition of the conveyor and the locations of filled and empty seats in predetermined positions of the seats along the path, said detecting means controlling the operation of the workpiece removal and depositing means whereby the workpiece removal and depositing means only remove workpieces from, and deposit workpieces into, the designated seats, and means defining a return conveyor path vertically aligned with the active conveyor path which comprises profiles following the return conveyor path to retain within their seats workpieces which are being returned along the return path to the beginning of the active conveyor path for completion of processing.

2. Apparatus according to claim 1, wherein the detecting means comprises first sensor means for determining the position of the conveyor, second sensor means associated with the workpiece depositing the removal means for detecting the presence and absence of filled and empty seats, and third sensing means for sensing the presence of predetermined empty seats and to control the feed means to deposit the workpiece into said predetermined empty seats.

3. Conveyor apparatus comprising means defining an active conveyor path passing adjacent a plurality of processing stations, each station of said plurality of stations adapted to execute a work function which is different than the work function executed by the preceding station, means defining an endless vertical conveyor movable along said path, said conveyor having means defining seats for workpieces to be conveyed along said path, means operative to feed workpieces to be conveyed along said path, means operative to feed workpieces to predetermined seats of the conveyor, means associated with the processing stations for removing workpieces from the seats for processing at the corresponding stations and depositing the processed workpieces into the seats, said removing and depositing means comprising a lifting means adapted to move the workpiece vertically with respect to the conveyor and a means for moving the workpiece horizontally from a position above the conveyor to the processing station, said seats consisting of a plurality of groups of seats, in each said group of seats individual seats being designated to receive only workpieces which are at a predetermined state in the process, first detecting means for detecting the instantaneous position of the conveyor said first detecting means comprising cam means in a number equal to the groups of seats rotating synchronically with the conveyor and an equal number of respective active feelers to denote the instantaneous position of the seats of the various groups of seats for the conveyor; second detecting means of the condition of filled and empty seats in predetermined positions of the seats along the path, said first and second detecting means controlling the operation of the workpiece removal and depositing means whereby the workpiece removal and depositing means only remove workpieces from, and deposit workpieces into, the designated seats, and means enabling any incompletely processed workpieces to be returned to the beginning of the active conveyor path, and third sensor means for sensing the presence of predetermined empty seats and to control the feed means to deposit the workpiece into said predetermined empty seats, means defining a return conveyor path vertically aligned with the active conveyor path and guides following the return path to retain within their seats workpieces which are being returned along the return path to the beginning of the active path for completion of processing.

4. Apparatus according to claim 3, wherein said cam means of said first detecting means are mounted on a transmission shaft of said continuous conveyor and cooperate with respective switch feelers.

5. Apparatus according to claim 3, wherein said second detecting means comprise switches in said predetermined positions of the seats along the path positioned to sense the presence or the absence of a workpiece in said seats.

6. Conveyor apparatus comprising means defining an active conveyor path passing adjacent a plurality of processing stations, means defining an endless conveyor movable along said path, said conveyor having means defining seats for workpieces to be conveyed along said path, means operative to feed workpieces to predetermined seats of the conveyor, means associated with the processing stations for removing workpieces from the seats for processing at the corresponding stations and to deposit the processed workpieces into the seats, said seats consisting of a plurality of groups of seats, in each said group of seats individual seats being designated to receive only workpieces which are at a predetermined stage in the process, detecting means for detecting the instantaneous condition of the conveyor and the locations of filled and empty seats in predetermined positions of the seats along the path, said detecting means controlling the operation of the workpiece removal and depositing means whereby the workpiece removal and depositing means only remove workpieces from, and deposit workpieces into, the designated seats, and means defining a return conveyor path vertically aligned with the active conveyor path, wherein said seats are shaped to retain workpieces which are being returned along a major portion of the return conveyor path to the beginning of the active path for completion of processing and means for assisting in the retaining of articles in the seats is positioned along the remaining portion of the return path.

7. An apparatus according to claim 6, wherein said seat comprise a lower and upper saddle, the lower saddle being adapted to support the workpiece along said active conveyor path and said upper saddle being in a position reverse of that of the lower saddle and adapted to support the workpiece along said return conveyor path.

8. An apparatus according to claim 6, further comprising means defining a first and second curved path portion interconnecting adjacent ends of the active and return path, and said assisting means comprises electromagnetic means for retaining in their seats, workpieces moving along said first curved portion.

9. An apparatus according to claim 8, wherein said upper and lower saddles are connected by an intermediate saddle which supports the workpiece along the second curved portion interconnecting the active and return paths of the conveyor.

*10. Conveyor apparatus for conveying workpieces to be processed in a predetermined fixed sequence of processing steps to a processing station at which a predetermined process in said fixed sequence is to be performed upon said workpieces, said conveyor apparatus comprising conveyor means adapted to move the workpiece through a continuous path which includes a portion adjacent to said processing station, said conveyor means including a plurality of workpiece advancing means, said workpiece advancing means being adapted to advance said workpieces through said continuous path so that they pass sequentially adjacent to said processing station, said plurality of workpiece advancing means comprising a plurality of first workpiece advancing means continuously having a first predetermined designation during operation of the conveyor apparatus and a plurality of second workpiece advancing means continuously having a second predetermined designation during such operation, said first predetermined designation designating workpieces in which the next processing step to be performed in said predetermined fixed sequence is the one to be performed in said processing station and said second predetermined designation designating workpieces which have just completed said next processing step, there being no specific required relationship between the position of a first workpiece advancing means on said conveyor means relative to the position of a second workpiece advancing means on said conveyor means as they do not interact directly one with the other, first detection means for determining which of said first and second workpiece advancing means is presented at said processing station, workpiece handling means associated with said processing station for removing said workpieces from said first workpiece advancing means for processing in said processing station and for returning said processed workpieces to said second workpiece advancing means, said workpiece handling means being operable in response to said first detection means so as to selectively remove said workpieces only from said first workpiece advancing means and to selectively return said processed workpieces only to said second workpiece advancing means, said conveyor means being designed so as to return any of said workpieces remaining in said workpiece advancing means to said portion of said path adjacent to said processing station.*

*11. The conveyor apparatus of claim 10, further including means for feeding workpieces to be processed to said endless conveyor and discharge means for removing processed workpieces from said workpiece seats affixed to said conveyor, said feed means being operative to feed workpieces to only said first workpiece seats and said discharge means being operative to remove said workpieces only from said second workpiece seats.*

*12. The conveyor apparatus according to claim 10, wherein said conveyor means comprises an endless conveyor.*

*13. The conveyor apparatus of claim 12 wherein said conveyor includes shaft means for driving said conveyor, and wherein said first detection means comprises a plurality of cam members including a first cam member corresponding to the location of said first workpiece advancing means and a second cam member corresponding to the location of said second workpiece advancing means and a plurality of microswitch means, including first microswitch means which are activated by said first cam member when said first workpiece advancing means are located at said processing station, and second microswitch means which are activated by said second cam member when said second workpiece advancing means are located at said processing station.*

*14. The conveyor apparatus according to claim 10, further comprising second detection means for detecting the presence or absence of a workpiece in said first and second workpiece advancing means at said processing station.*

*15. The conveyor apparatus of claim 14 wherein said second detection means comprises microswitch means.*

*16. The conveyor apparatus according to claim 10, wherein said workpiece advancing means comprises seats for carrying said workpieces, and said seats are affixed to said conveyor means.*

*17. The apparatus of claim 16 wherein said plurality of workpiece seats are shaped to retain workpieces which are being returned to said portion of said path adjacent to said processing station.*

*18. Conveyor apparatus for conveyor workpieces to be processed in a predetermined fixed sequence of processing*

*steps to a plurality of processing stations including first and second processing stations at which first and second predetermined processes, respectively, in said fixed sequence are to be performed upon said workpieces in a sequential manner, said conveyor apparatus comprising conveyor means adapted to move the workpieces through a continuous path which includes a portion adjacent to said plurality of processing stations, said conveyor means including a plurality of workpiece advancing means, said workpiece advancing means being adapted to advance said workpieces through said continuous path so that they pass sequentially adjacent to said plurality of processing stations, said plurality of workpiece advancing means comprising a plurality of first workpiece advancing means continuously having a first predetermined designation during operation of the conveyor apparatus, a plurality of second workpiece advancing means continuously having a second predetermined designation during such operation, and a plurality of third workpiece advancing means continuously having a third predetermined designation during said operation, said first predetermined designation designating workpieces in which the next processing step to be performed in said predetermined fixed sequence is the one to be performed in said first processing station, said second predetermined designation designating workpieces which have just completed said processing step performed in said first processing station and in which the next processing step to be performed in said predetermined fixed sequence is the one to be performed in said second processing station, and said third predetermined designation designating workpieces which have just completed said processing step performed in said second processing station, there being no specific required relationship between the position of a first workpiece advancing means on said conveyor means relative to the position of a second workpiece advancing means or a third workpiece advancing means on said conveyor means or between the position of a second workpiece advancing means on said conveyor means relative to the position of a third workpiece advancing means on said conveyor means as they do not interact directly one with the other, first detection means for determining which of said first, second and third workpiece advancing means is presented at each of said plurality of processing stations, first workpiece handling means associated with said first processing station for removing said workpieces from said first workpiece advancing means for processing in said first processing station and for returning said workpieces processed in said first processing station to said second workpiece advancing means, second workpiece handling means associated with said second processing station for removing said workpieces from said second workpiece advancing means for processing in said second processing station and for returning said workpieces processed in said second processing station to said third workpiece advancing means, said first and second workpiece handling means being operable in response to said first detection means so as to selectively remove said workpieces only from said first workpiece advancing means for processing in said first processing station, to selectively return said workpieces processed in said first processing station only to said second workpiece advancing means, to selectively remove said workpieces only from said second workpiece advancing means for processing in said second processing station, and to selectively return said workpieces processed in said second processing station only to said third workpiece advancing means, said conveyor means being designed so as to return any of said workpieces remaining in said workpiece advancing means to said portion of said path adjacent each of said plurality of processing stations.*

*19. The conveyor apparatus of claim 12, further including feed means for feeding workpieces to be processed to said workpieces affixed to said endless conveyor and discharge means for removing workpieces processed in said first and second processing stations from said workpiece seats affixed to said conveyor, said feed means being operative to feed workpieces only to said first workpiece seats and said discharge means being operative to remove workpieces only from said third workpiece seats.*

*20. The conveyor apparatus according to claim 18, wherein said conveyor means comprises an endless conveyor.*

*21. The conveyor apparatus according to claim 18, further comprising second detection means for detecting the presence or absence of a workpiece in said first, second and third workpiece advancing means at each of said plurality of processing stations.*

*22. The conveyor apparatus according to claim 18, wherein said workpiece advancing means comprises seats for carrying said workpieces, and said seats are affixed to said conveyor means.*

* * * * *

UNITED STATES PATENT AND TRADEMARK OFFICE

CERTIFICATE OF CORRECTION

PATENT NO. : Re. 31,945

DATED : July 16, 1985

INVENTOR(S) : Antonio Magni

It is certified that error appears in the above-identified patent and that said Letters Patent is hereby corrected as shown below:

Column 6, line 40, "state" should read --stage--.

Column 8, line 29, before "means" insert --feed--.
Line 30, delete "endless" and insert therefor --workpiece advancing means of said--.
Line 30, after "conveyor", insert --means--.
Line 31, delete "seats affixed to" and insert therefor --advancing means of--.
Line 32, after "conveyor", insert --means--.
Line 33, delete "seats" and insert therefor --advancing means--.
Line 35, delete "seats" and insert therefor --advancing means--.

Column 10, line 25, "Claim 12" should read --Claim 18--.
Line 27, delete "workpieces affixed to said endless" and insert therefor --workpiece advancing means of said--.
Line 27, after "conveyor", insert --means--.
Line 29, after "workpiece", insert --advancing means of--.
Lines 29-30, delete "seats affixed to".
Line 30, after "conveyor", insert --means--.
Line 31, delete "seats" and insert therefor --advancing means--.

UNITED STATES PATENT AND TRADEMARK OFFICE

CERTIFICATE OF CORRECTION

PATENT NO. : Re. 31,945

DATED : July 16, 1985

INVENTOR(S) : Antonio Magni

It is certified that error appears in the above-identified patent and that said Letters Patent is hereby corrected as shown below:

Line 33, delete "seats" and insert therefor --advancing means--.

Signed and Sealed this

*Twenty-ninth* Day of *October 1985*

[SEAL]

*Attest:*

DONALD J. QUIGG

*Attesting Officer*

*Commissioner of Patents and Trademarks—Designate*